(12) United States Patent
Kwiram

(10) Patent No.: US 10,715,910 B2
(45) Date of Patent: Jul. 14, 2020

(54) EQUALIZATION INTERFACE

(71) Applicant: Andrew Brandt Kwiram, San Francisco, CA (US)

(72) Inventor: Andrew Brandt Kwiram, San Francisco, CA (US)

(73) Assignee: LAMASSU LLC, San Jose, CA (US)

( * ) Notice: Subject to any disclaimer, the term of this patent is extended or adjusted under 35 U.S.C. 154(b) by 0 days.

(21) Appl. No.: 15/201,810

(22) Filed: Jul. 5, 2016

(65) Prior Publication Data
US 2019/0394566 A1 Dec. 26, 2019

Related U.S. Application Data

(60) Provisional application No. 62/188,581, filed on Jul. 3, 2015.

(51) Int. Cl.
*H04R 3/04* (2006.01)
*G06F 3/0482* (2013.01)
*G06F 3/01* (2006.01)
*G06F 3/0488* (2013.01)
*G06F 3/0484* (2013.01)

(52) U.S. Cl.
CPC ............... *H04R 3/04* (2013.01); *G06F 3/011* (2013.01); *G06F 3/017* (2013.01); *G06F 3/0482* (2013.01); *G06F 3/04847* (2013.01); *G06F 3/04883* (2013.01)

(58) Field of Classification Search
CPC . H04R 3/04; G06F 3/011; G06F 3/017; G06F 3/0482; G06F 3/04847; G06F 3/04883
USPC ........................................................ 381/98
See application file for complete search history.

(56) References Cited

U.S. PATENT DOCUMENTS

2014/0161281 A1* 6/2014 Nackvi .................. H03G 5/165
381/98

* cited by examiner

*Primary Examiner* — Paul Kim
(74) *Attorney, Agent, or Firm* — Squire Patton Boggs US LLP

(57) ABSTRACT

A system for applying a filtering scheme to an audio signal in which one or more predefined audio filtering schemes may be applied. A user interface is provided for receiving input from a user and displaying status information to the user, and may include one of a variety of adjustment controls such as a physical knob, switch, dial, slide, button, digital touchscreen, or remote control, among others. Varying linear and nonlinear filtering schemes may be provided to impact various frequency ranges in the audio signal to generate an output signal.

11 Claims, 3 Drawing Sheets

EQUALIZATION INTERFACE

PRIORITY CLAIM

This application claims priority to U.S. Patent Application No. 62/188,581, filed Jul. 3, 2015 and titled, "EQUALIZATION INTERFACE," the contents of which is incorporated by reference in its entirety.

BRIEF DESCRIPTION OF THE DRAWINGS

The features and advantages of the present disclosure will be more fully understood with reference to the following detailed description when taken in conjunction with the accompanying figures, wherein.

SUMMARY

Figure 1A:
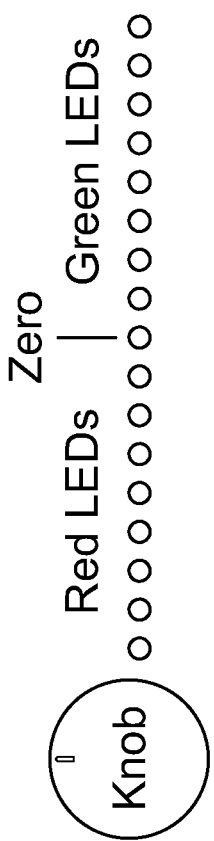
FIGS. 1A-1E show contemplated analog implementation of the present invention.
Figure 1B:
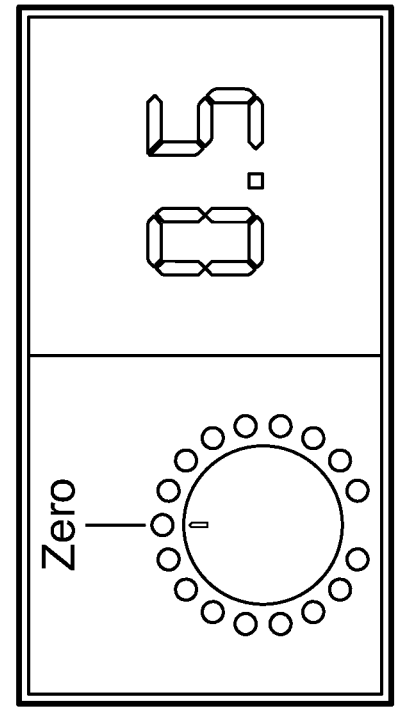
Figure 1C:
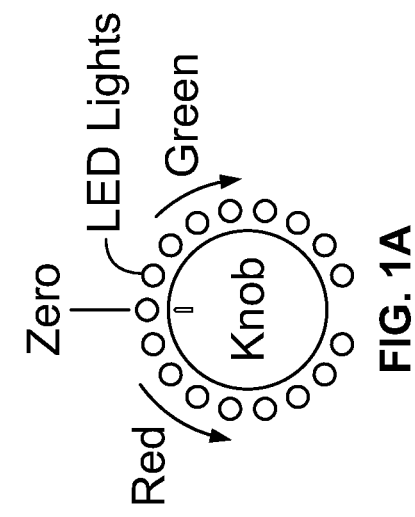
Figure 1D:
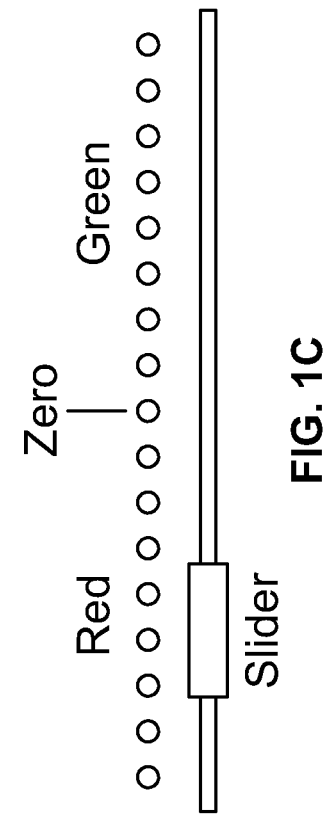
Figure 1E:
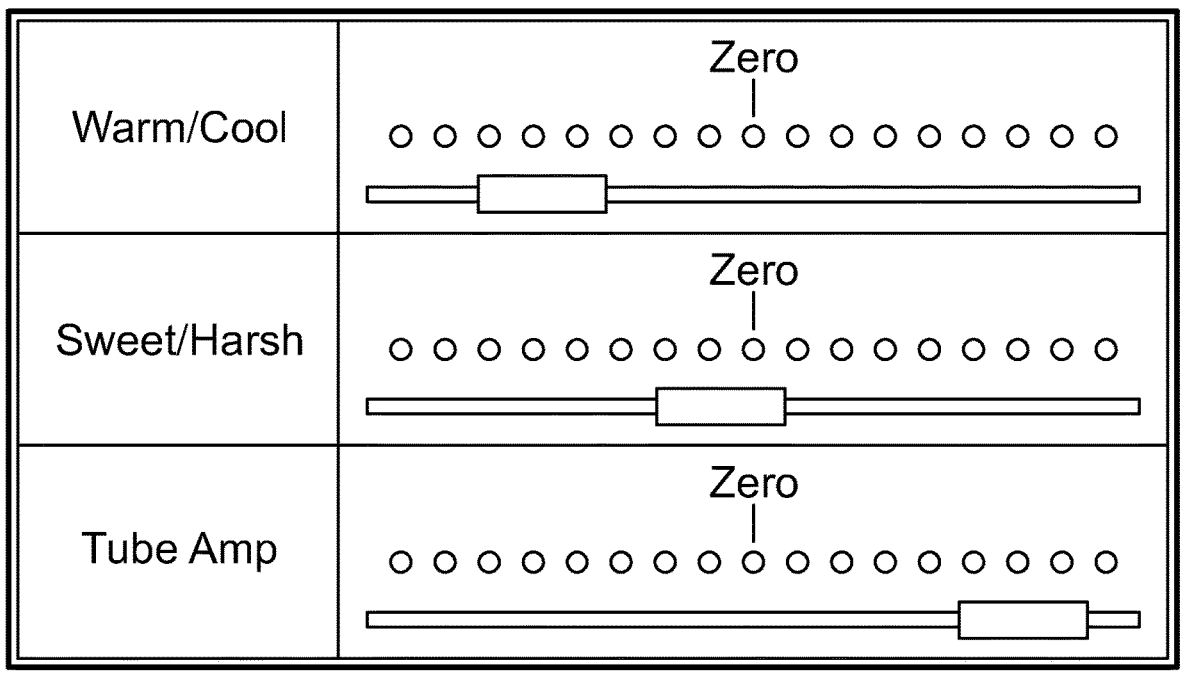

In some embodiments, a system for applying a filtering scheme to an audio signal may include a memory for storing one or more predefined audio filtering schemes for application to an input signal, the memory, and/or a user interface for receiving input from a user and displaying status information to the user. In some embodiments, one or more predefined filtering schemes apply linear distortion to an input signal, the linear distortion schemes affecting two or more separate frequency ranges in the audible spectrum.

In some embodiments, the user interface is configured to receive input from the user corresponding to the selection of a desired audio filtering scheme for application to the audio signal. In some embodiments, the user interface may include an adjustment control adapted to receive input from a user concerning the intensity of application of the selected predefined audio filtering scheme and communicate the input to a means of signal processing.

In some embodiments, a signal processing means is configured to receive an audio signal, apply a predefined audio filtering scheme to the signal, and output a modified audio signal.

In some embodiments, multiple predefined audio filtering schemes may be selected and combined for simultaneous application. In some embodiments, the predefined filtering schemes may include one or more filters that may include a predefined linear distortion filter affecting two or more independent frequency bands. In some embodiments, one or more filters may further include a predefined nonlinear distortion filter.

In some embodiments, the intensity of application of a given audio adjustment scheme in two or more independent frequency ranges may be adjusted in a single frequency range independent of the intensity of application of adjustment in the other frequency range(s) affected by the adjustment scheme.

In some embodiments, the adjustment control is one of a physical knob, switch, dial, slide, or button. In some embodiments, the user interface may include a digital touchscreen adapted to display one or more adjustment controls to a user. In some embodiments, the user interface is a gestural interface adapted to respond to non-tactile user gestures indicating a desired intensity of the audio adjustment scheme. In some embodiments, the user interface may further include a remote input device for controlling the audio adjustment scheme. In some embodiments, the user interface and signal processing means are further configured to adjust the intensity of application of the audio adjustment scheme in increments as fine as 0.1 dB.

In some embodiments, an audio signal filtering system may include a memory for storing a group of audio filtering schemes; a user interface configured to receive input from a user corresponding to the selection of a desired audio filtering scheme, and display status information to the user; and/or a signal processing apparatus configured to receive an audio signal, apply one of the audio filtering schemes to the signal, and output a modified audio signal.

In some embodiments, the user interface may include an adjustment control for receiving input from a user concerning the intensity of application of the audio filtering schemes. In some embodiments, the signal processing apparatus, using one of the audio filtering schemes, applies linear distortion to an input signal, the linear distortion affecting two or more separate frequency ranges in the audible spectrum with intermediate frequencies that are not affected by the filtering scheme.

DETAILED DESCRIPTION

Equalization ("EQ"), the boosting or cutting of one or more frequencies in reproduced sound, is a ubiquitous tool in audio. It is used to adjust reproduced sound to account for the capture characteristics of microphones, to alter the perceived balance of instruments within a mix, to alter the output of loudspeakers to better interface with rooms and performance venues, or to suit listener preferences, among other functions.

Traditionally, EQ has been implemented with three primary interface types. The first is highly adjustable, epitomized by the "graphic equalizer" interface employing a plurality of slider bars (or a plurality of knobs serving the same function as slider bars), implemented both with actual physical sliders and as a computer metaphor with virtual sliders. This interface has been used in all audio contexts but is dominant in recording studio and sound reinforcement applications. The second interface type provides a fixed effect, and is currently the dominant interface for consumer-facing applications such as in smartphones, portable music players, and stereo and home theater receivers. For instance, EQ modes such as "stadium", "jazz club", "classical", "electronic", "rock", etc. may be provided. These modes are not adjustable and the user is not provided with information about the specific equalization scheme applied to the sound (e.g. which frequency bands are affected). The third interface type is highly customizable and computer-display based, with a plurality of filter types available for use. This type of interface is common in recording studios and other professional contexts.

There are many types of equalization filters, with the two most common being the so-called parametric and shelving types. Parametric EQ imposes a "bell-curve" shaped adjustment (boost or reduction) on the audio signal, with the center frequency, quality factor ("Q"), and other properties subject to adjustment. Shelving EQ applies a relatively rapid boost or cut at a specified frequency, above which (or below which, depending on application) the EQ adjustment rises to a certain level and then remains constant at that level for higher (lower) frequencies. There are many other EQ filter types, such as the Baxandall curve, Pultec curve, and Butterworth boost, and simple sloped filters with progressively increasing (decreasing) effect with rising or falling frequency away from a defined "hinge point", among others.

Desired EQ adjustments often affect two or more frequency bands. For example, it is often desirable to make reproduced sound "warmer" which is typically accomplished by reducing treble output in the range around 3-7 kHz, and by simultaneously raising lower midrange/midbass output around 200-600 Hz (applying the inverse adjustment will create a "cooler" sound. Alternatively, to create a "thinner" sound the audio signal may be adjusted with a cut in approximately the 75-600 Hz range as well as a boost in the 15-20 kHz range (the inverse adjustment would create a "fatter" sound). There are many other such examples of commonly desired adjustments involving more than one frequency band that are musically significant, e.g. "sweet" vs "harsh", "present" vs "recessed", "bright vs "dark", the so-called "BBC dip" filter, etc.

In implementing an EQ scheme, it is also desirable to be able to adjust, in fine increments, the level of EQ applied in order to suit the recording or performance, the specific reproduction situation, the user's tastes, etc. Listeners may react to level differences of as little as 0.1 dB.

It is further desirable to be able to adjust different elements of a multi-band equalization independently. For instance, in applying a "warming" equalization scheme, it is desirable to be able to adjust the level of lower midrange boost around 200-600 Hz independently of the level of treble reduction around 3-7 kHz.

It is further desirable to be able to adjust for example the center frequency (for parametric EQ) or onset frequency (for shelving EQ) of each element of the equalization scheme. For example, in the example of "warming" the sound, it may be desirable, given an EQ scheme with bass boost starting at 300 Hz and treble cut starting at 4 kHz, to be able to shift the onset frequency for the bass adjustment higher or lower, and to shift the onset of treble rolloff higher or lower as well as to adjust the slope of the treble rolloff.

It is further desirable to be able to adjust the described EQ elements from the listening position, rather than from an equipment rack that may be distant from the listening position.

Making such complex adjustments may be possible with the "graphic equalizer" interface, but making such adjustments properly without expert knowledge is difficult with a "graphic equalizer" interface as it may not be obvious to non-expert users which specific frequency bands should be adjusted to achieve the desired result. It may also be difficult to achieve the desired precision of adjustment, as the equalizer interface provides a limited number of "sliders" i.e. frequency bands in which to make adjustments. Making such adjustments with computer-based interfaces may be more straightforward (i.e. selecting a shelving or Baxandall filter may be much easier to do with an automated computer interface than with a slider interface) however it may still require expert skill to select the most effective combination of frequency ranges for EQ, filter types, and frequency onset points for those filters, among other required decisions.

Making such complex adjustments with the interfaces provided in smartphones, home theater receivers, etc. is generally not possible, as the only adjustment typically provided is to switch the specific EQ scheme on or off.

It is therefore desirable to provide an invention that provides users with a method to implement preloaded, expert-designed, and musically desirable EQ "templates" (such as warm/cool, thin/fat, present/recessed, etc.) with one-touch fine-grained (0.1 dB increment) user adjustment of the chosen EQ template application intensity via rotary knob, slider bar, touchscreen gesture (swipe up or down), or free-air gesture (wave up, wave down, etc.). Such an interface may further offer the ability to independently adjust elements of the provided EQ or signal modification template(s) including elements such as the intensity of modification of each frequency range of the applied multi-range EQ scheme, or the EQ onset frequency, center frequencies, hinge points, slope angles, etc. of individual frequency range adjustments. Such elements may be adjusted via a simple "up-down" and "left-right" set of input options implemented via the described "one-touch" interface method (knob, touchscreen gesture, free-air gesture, etc.). Such an invention providing musically significant expert-designed signal modification templates with user-friendly methods to alter said templates to suit the user's particular system playback conditions, individual listening preferences, etc. may significantly enhance the utility of EQ to nonexpert users, or users without access to, and knowledge of how to use, sophisticated computer-based EQ tools that do not provide EQ and other signal-modification templates.

Inclusion of other signal modification templates beyond frequency boosts or cuts is also contemplated, such as the addition of harmonic distortion or combinations of harmonic distortion and EQ. For instance, it may be desirable to apply a combination of EQ and harmonic distortion modifications to cause a speaker with neutral sound to mimic the sound of another type of speaker, or to cause a neutral system to take on the characteristic sound of a system employing certain types of signal chain components with characteristic frequency-related distortion signatures, such as single-ended triode amplifiers or vinyl record players. It may also be desirable to adjust the application intensity of signal modifications intended as room-related acoustic corrections. All such contemplated signal modifications may also be adjusted in application intensity via a one-touch interface.

In preferred embodiments of the invention, a sound reproduction system is provided, including a signal source, amplification, and speakers. The signal source is preferably digital, or an analog signal may preferably be converted to digital for processing.

In preferred embodiments, the invention includes: (1) predetermined digital EQ and other filter types (e.g. harmonic distortion, room correction) affecting multiple frequency bands loaded into a device capable of applying such filters to the digital audio signal; (2) a remote control including a screen allowing selection of the desired filter(s) for application; such screen in preferred embodiments shall also provide a graphic display of the filter types and affected frequency ranges; and (3) a knob, slider bar, touchscreen, or gestural interface allowing adjustment of the application intensity of the selected filter template, from no application intensity (no signal modification) upward or downward (e.g. warmer or cooler) in 0.1 dB increments.

In preferred embodiments, the user shall have the further option to select individual frequency ranges for independent adjustment, i.e. to further tailor or "fine-tune" the effect of the templated signal modification. For instance, in a warming filter applying adjustments in both the midbass and treble ranges, the user shall have the option (for example) to adjust the application intensity, center frequency, and Q of the midbass adjustment (e.g. a single tap on the displayed midbass EQ followed by a swipe up could cause the application intensity to increase, while a long tap could cause selection of the filter Q for adjustment) independently of the hinge point and slope of the treble adjustment by pressing, e.g., a touchscreen and dragging a finger side to side or up and down.

In preferred embodiments, the user shall also have the option to select multiple filter types for simultaneous application to the signal, and to name and store adjusted filter templates and combinations of such templates or adjusted templates for later recall and application.

In other embodiments, no remote control may be provided, and the digital filter template may be applied without graphic representation of the affected frequency ranges. For instance, filter templates may be selected via a fixed button interface (with a button for warmer, cooler, etc.) and intensity may be adjusted via knob, slider, or other physical input method with the intensity of application indicated via numeric representation by LED numerals, illuminated markers (e.g. a row of LEDs each corresponding to a 0.1 dB or other defined increment of filter application), or any other method of denoting the intensity of the applied filter template as may be desirable.

In embodiments, a predetermined or templated digital filtering scheme is disclosed, particularly one affecting two or more frequency bands, or applying a predetermined harmonic distortion type, or applying an independently defined room correction filter; and an interface to adjust the intensity of application of one or more such filters, and individual frequency band EQ elements, in 0.1 dB or greater increments with a one-touch approach, e.g. via a knob turn, slider movement, finger swipe, gesture, etc.

In preferred embodiments, a user is able to tailor the preferred system sound via a sonically lossless digital process (no analog EQ devices in the signal chain), including the sound of other speaker types for instance, or other amplifier types.

Reference is made to the attached drawings.

FIGS. 1A-1E show contemplated analog implementations of the present invention. One could incorporate such filter templates into a CD player, D/A converter (after D/A conversion), preamplifier, etc. A single filter template type (e.g. "warm/cool") or multiple filter template types may be embodied in analog circuitry and the degree of application intensity may be adjusted via knob, slider bar, button, etc., with the degree of application of each filter controlled by a dedicated knob, slider, or other input mechanism. The degree of filter application (e.g. plus 1.7 dB, or minus 0.5 dB, etc.) may be indicated by LEDs (with e.g. "cooling" indicated by red LEDs in FIGS. 1A, 1B, 1C, and 1E and "warming" indicated by green LEDs) or an LED, LCD, OLED or other graphic numeric display, with e.g. the application of a "warming" filter indicated in 0.1 dB increments as positive numbers and "cooling" indicated as negative numbers. By such means a single filter type or multiple filter types could be implemented in an analog device.

Figure 2:
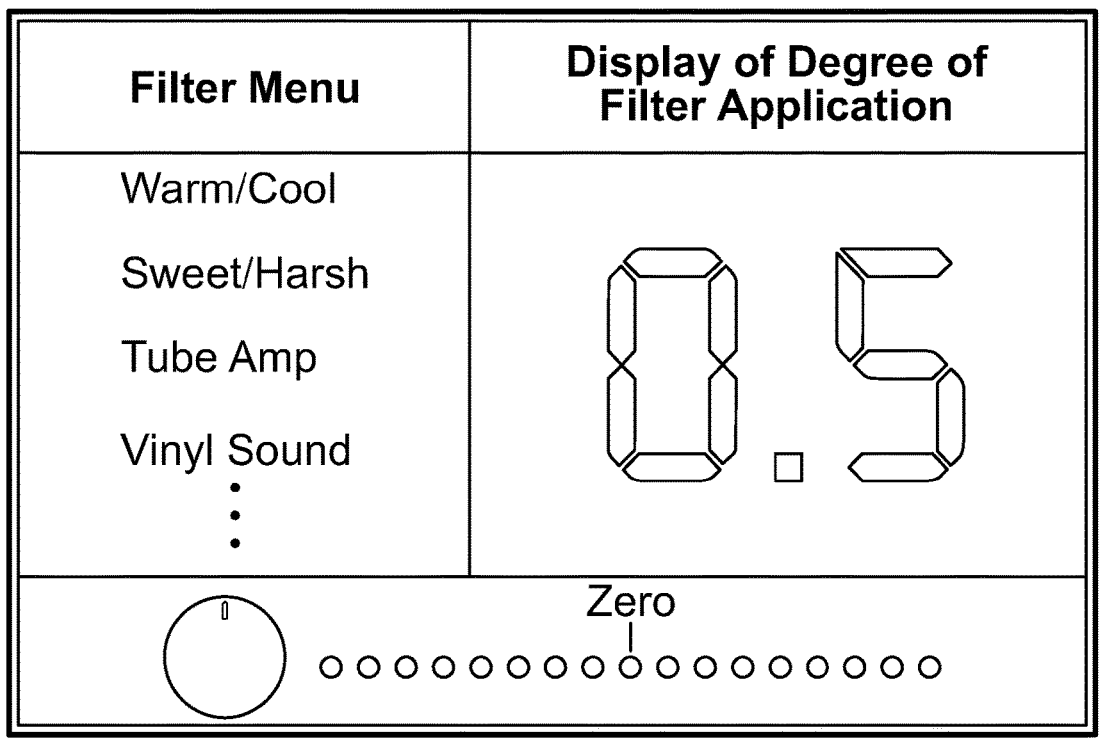
FIG. 2 shows a basic digital embodiment of the present invention.

FIG. 2 shows a basic digital embodiment in which various filter templates (EQ, harmonic distortion, etc.) may be selected via knob, button, slider, touchscreen, free air gesture, etc. and the degree of application of the chosen filter template is shown on a display, again in decibels.

Figure 3:
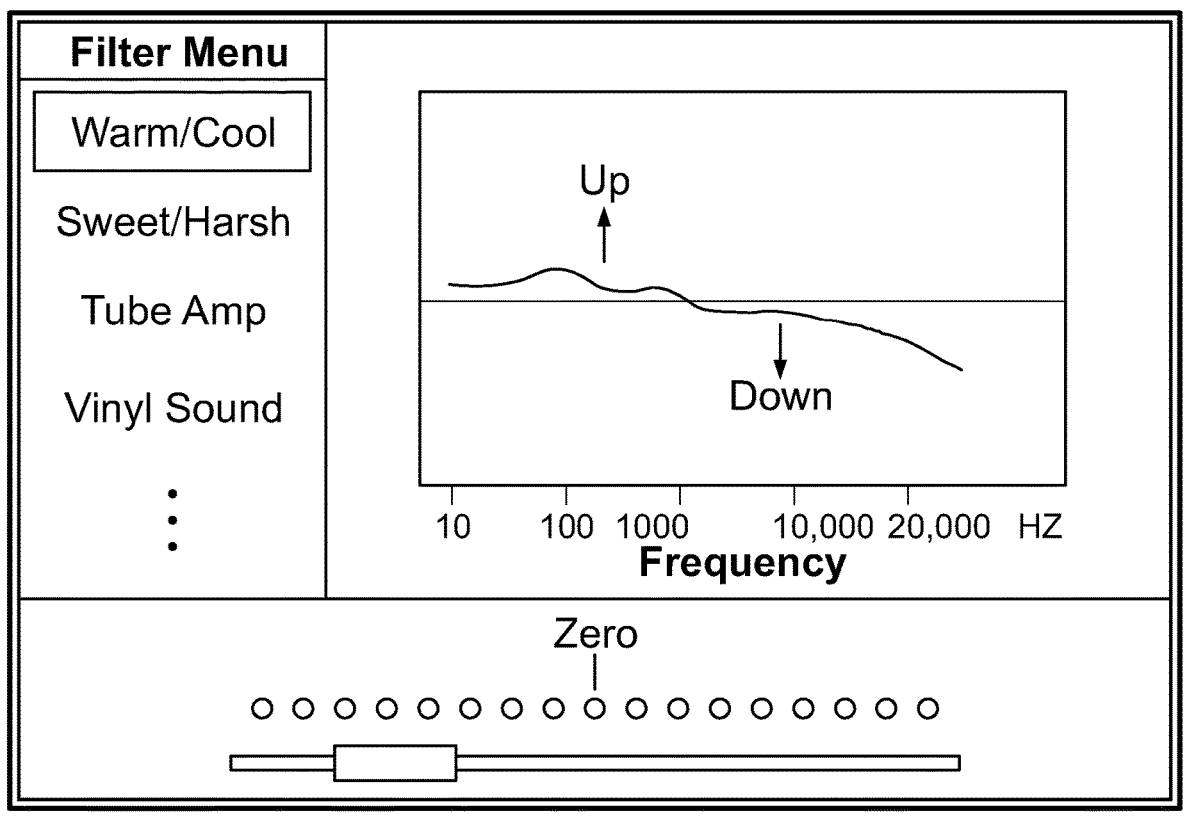
FIG. 3 shows a preferred embodiment with digital filter templates and a graphic display.

FIG. 3 shows a preferred embodiment with digital filter templates and a graphic display. Various filter templates may be selected via touchscreen, knob, or other input method, and the actual EQ curve being applied is displayed on the screen. With a touchscreen, each individual frequency range affected by the chosen filter template may be selected for individual adjustment (e.g. in a warming filter that affects both the midbass and the treble, e.g. shelving EQ in the midbass may be selected and adjusted for application intensity and center frequency independently of the e.g. sloped filter hinge point and slope in the treble range).

It will be understood that there are numerous modifications of the illustrated embodiments described above that will be readily apparent to one skilled in the art, such as many variations and modifications of the system and/or its components including combinations of features disclosed herein that are individually disclosed or claimed herein, explicitly including additional combinations of such features, or alternatively other types of components. Also, there are many possible variations in the components and configurations. These modifications and/or combinations fall within the art to which this invention relates and are intended to be within the scope of the claims, which follow. It is noted, as is conventional, the use of a singular element in a claim is intended to cover one or more of such an element.

We claim:

1. A system for applying a filtering scheme to an audio signal comprising:

a memory for storing one or more predefined audio filtering schemes for application to an input signal;

said memory including one or more predefined filtering schemes applying linear distortion to an input signal, said linear distortion schemes affecting two or more separate frequency ranges in the audible spectrum;

a user interface for receiving input from a user and displaying status information to the user;

wherein said user interface is configured to receive input from the user corresponding to the selection of a desired audio filtering scheme for application to said audio signal;

wherein said user interface includes an adjustment control adapted to receive input from a user concerning the intensity of application of the selected predefined audio filtering scheme and communicate said input to a means of signal processing; and a signal processing means configured to receive an audio signal, apply a predefined audio filtering scheme to said signal, and output a modified audio signal.

2. The system of claim 1 wherein multiple said predefined audio filtering schemes may be selected and combined for simultaneous application.

3. The system of claim 1 in which the predefined filtering schemes include one or more filters comprising a predefined linear distortion filter affecting two or more independent frequency bands.

4. The system of claim 3 wherein the one or more filters further comprises a predefined nonlinear distortion filter.

5. The system of claim 1 wherein the intensity of application of a given audio adjustment scheme in two or more independent frequency ranges may be adjusted in a single frequency range independent of the intensity of application of adjustment in the other frequency range(s) affected by said adjustment scheme.

6. The system of claim 1 wherein said adjustment control is one of a physical knob, switch, dial, slide, or button.

7. The system of claim 1 wherein said user interface comprises a digital touchscreen adapted to display one or more adjustment controls to a user.

8. The system of claim 1 wherein said user interface is a gestural interface adapted to respond to non-tactile user gestures indicating a desired intensity of said audio adjustment scheme.

9. The system of claim 1 wherein said user interface further comprises a remote input device for controlling said audio adjustment scheme.

10. The system of claim 1 wherein said user interface and signal processing means are further configured to adjust the intensity of application of said audio adjustment scheme in increments as fine as 0.1 dB.

11. An audio signal filtering system comprising:
- a memory for storing a plurality of audio filtering schemes;
- a user interface configured to receive input from a user corresponding to the selection of a desired audio filtering scheme, and display status information to the user;
- a signal processing apparatus configured to receive an audio signal, apply one of said audio filtering schemes to said signal, and output a modified audio signal;
- wherein said user interface comprises an adjustment control for receiving input from a user concerning the intensity of application of said audio filtering schemes; and
- wherein said signal processing apparatus, using one of said audio filtering schemes, applies linear distortion to an input signal, said linear distortion affecting two or more separate frequency ranges in the audible spectrum with intermediate frequencies that are not affected by the filtering scheme.

* * * * *